Sept. 2, 1969  W. G. FRANKE  3,464,711
COMPOUND PIPE CHUCK
Filed June 2, 1966

INVENTOR.
WALLACE G. FRANKE
BY Stanley C. Bimish
ATTORNEY

United States Patent Office 3,464,711
Patented Sept. 2, 1969

---

3,464,711
COMPOUND PIPE CHUCK
Wallace G. Franke, 803 S. Story St.,
Appleton, Wis. 54911
Filed June 2, 1966, Ser. No. 554,910
Int. Cl. B23b *31/00;* B25g *3/22*
U.S. Cl. 279—7                                   2 Claims

ABSTRACT OF THE DISCLOSURE

A tool for holding the threaded ends of various diameter pipes having a series of progressively stepped down counterbores terminating at annular shoulders and the counterbores having threads extending to the annular shoulders.

---

This invention relates generally to mechanical chucks, and more particularly to a rigid, stepped type chuck for holding pipes of large and different diameters during cutting thereof or other machining operations thereon.

The purpose of this invention is to eliminate the need for leaving a job and running back to the shop to cut, thread or ream pipes of large diameters.

A power pipe cutter machine is generally used for the machining of large diameter pipes. However, because such power cutters are large, heavy and bulky they are not ordinarily used on the job site, but are stationed in a permanent shop for use at such shop. Also because of the high initial cost, high maintenance cost, and time loss in replacing of the tools or blades and in the adjustment of the power cutter when sprung, such power cutters are not ordinarily moved from job to job for on the job use.

Because such power cutters are sometimes deemed more trouble than they are worth, the contractor will often supply the mechanic on the job, with a wheel pipe cutter and reamed to be used and operated by hand, manually. For operations on pipes of large diameters, such manual work is arduous, tedious and slow.

An object of this invention is the provision of a pipe chuck that provides maximum convenience in promoting handy and ready use, when working with large diameter pipes on an on-the-job location.

Another object is to provide a stepped type pipe chuck for holding pipes of different diameters.

Still another object of this invention is the provision of a rigid, one-piece pipe chuck for holding pipes of different diameters.

Yet another object is to provide a simplified pipe chuck having no moving parts.

Other specific objects and many of the attendant advantages of this invention will be readily appreciated as the same becomes better understood by reference to the following detailed description when considered in connection with the accompanying drawings in which like reference numerals designate like parts throughout the figures thereof and wherein.

Figure 1:
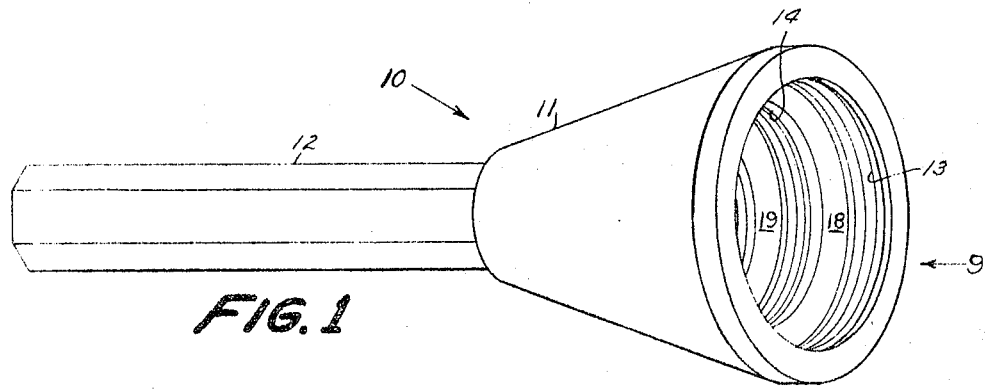
FIG. 1 is an isometric view of the invention.
Figure 2:
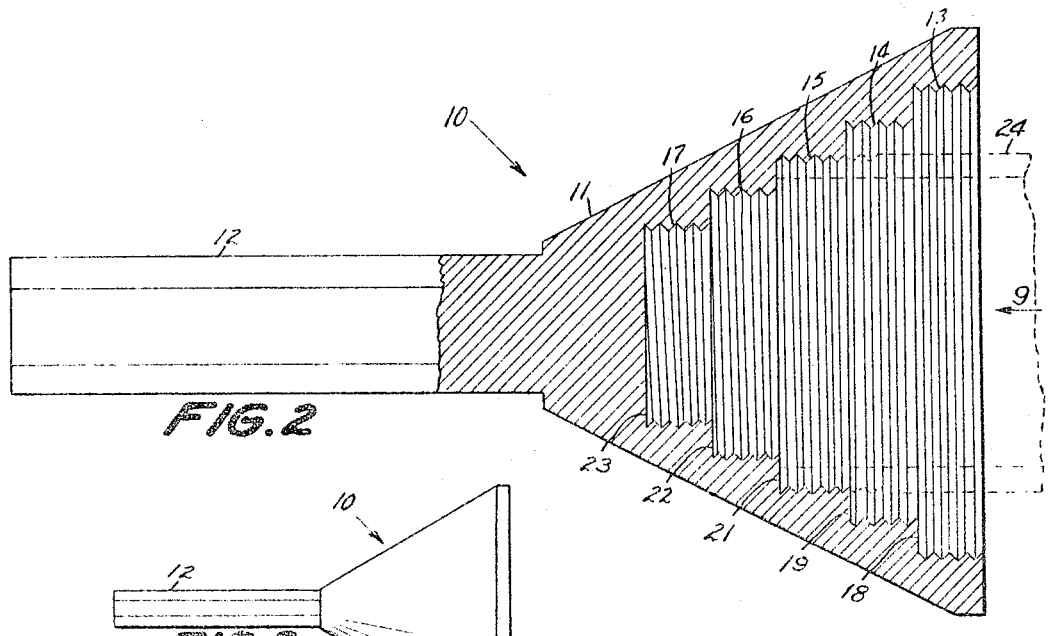
FIG. 2 is a longitudinal section view of the device shown in FIG. 1.
Figure 3:
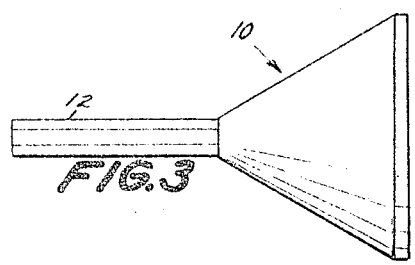
FIG. 3 is a side elevation view of the device shown in FIG. 1.

Referring now to the drawings, wherein like reference numerals designate like or corresponding parts throughout the several views thereof, there is shown a one-piece pipe chuck generally indicated at 10 having a frusto-conical body 11 and an elongated hexagonal shank 12 extending axially from the rearward small end of said body 11.

The body 11 is recessed or hollowed and open at its forward large base end, generally indicated at 9, and provided with a tandem series of internally threaded counterbores 13, 14, 15, 16, and 17. Each of said coaxial threaded counterbores being adapted to receive threaded pipes of different diameter sizes, respectively, thereby to accommodate machining operations on pipes of various diameters.

Each bore, and threads thereon, terminate at annular shoulder or abutment, formed by the offset relationship of the peripheries of said reduced diameter bores, such as indicated at 18, 19, 21, 22 and 23, respectively, thereby to provide a stop abutment for pipes threadedly received in said threaded bores, respectively.

Operation

The subject compound pipe chuck is mounted in a conventional rotatable chuck means, or in the chuck of the usual pipe cutter machine or power pipe vice by inserting the shank 12 into the chuck thereof, and securing it therein. A large diameter pipe having one end threaded, such as indicated by dotted lines 24, which is to be cut or threaded, is threadedly engaged and advanced in a corresponding threaded bore such as bore 14, until the pipe end abuts associated annular shoulder 19. The usual pipe cutter tool is then applied on the pipe, at any predetermined point, and tightened thereon for the cutting operation. The usual tool rest is available against which the tool is abutted to prevent rotation thereof. As the chuck and associated pipe are rotated the cutter tool is manipulated in the usual way until the pipe is cut through and severed.

Some characteristic features of this invention are the provision of a stepped type of pipe chuck for accommodating pipes of different diameters; the provision of a one-piece pipe chuck for holding pipes of various diameters; the provision of a simplified pipe chuck that is entirely rigid; and a pipe chuck that has no moving parts whatsoever.

Obviously many modifications and variations of the present invention are possible in the light of the above teachings. It is therefore to be understood, that within the scope of the appended claims, the invention may be practiced otherwise than as specifically described.

What is claimed and desired to be protected by Letters Patent of the United States is:

1. A compound pipe chuck, comprising: a body having a tandem series of axially aligned, and internally threaded counterbores, said counterbores terminating at annular shoulders formed between said counterbores and said threads extending to said annular shoulders; and a shank extending from said body, said shank being axially aligned with said counterbores and adapted to be held in chuck means.

2. A compound pipe chuck, comprising: a frusto-conical body having a plurality of axially aligned, progressively reduced diameter bores commencing at the base face of said frusto-conical body and disposed coaxially with the axis of said frusto-conical body, said bores terminating at the annular shoulders formed by the offset relationship of the peripheries of said reduced diameter bores; threads on the inner periphery of said bores commencing at the inception of said bores and extending to said annular shoulders, respectively; and a shank extending from the small end of said body, said shank being disposed axially aligned with the axis of said frusto-conical body.

References Cited

UNITED STATES PATENTS

| 154,444 | 8/1874 | Bauser | 279—99 |
|---|---|---|---|
| 994,441 | 6/1911 | Burke | 285—177 X |

ROBERT C. RIORDON, Primary Examiner

DAVID R. MELTON, Assistant Examiner